(12) United States Patent
Chang

(10) Patent No.: US 7,684,211 B2
(45) Date of Patent: Mar. 23, 2010

(54) ADD-IN CARD FASTENER

(75) Inventor: Lin-Wei Chang, Taipei (TW)

(73) Assignee: Inventec Corporations, Taipei (CN)

( * ) Notice: Subject to any disclaimer, the term of this patent is extended or adjusted under 35 U.S.C. 154(b) by 303 days.

(21) Appl. No.: 11/878,894

(22) Filed: Jul. 27, 2007

(65) Prior Publication Data
US 2009/0027862 A1  Jan. 29, 2009

(51) Int. Cl.
H05K 7/18 (2006.01)
(52) U.S. Cl. .................... 361/801; 361/802
(58) Field of Classification Search ......... 361/801–803, 361/807–810; 439/625–626, 629–630
See application file for complete search history.

(56) References Cited

U.S. PATENT DOCUMENTS 6,480,392 B1 * 11/2002 Jiang ..................... 361/755
7,035,117 B2 * 4/2006 Chen et al. ............... 361/801
7,120,032 B2 * 10/2006 Lin et al. ................. 361/801
7,203,076 B1 * 4/2007 Liang ..................... 361/801

* cited by examiner

Primary Examiner—Hung S Bui
(74) Attorney, Agent, or Firm—CKC & Partners Co., Ltd.

(57) ABSTRACT

An add-in card fastener is provided. The fastener includes a base, a pressing part, a latch and a supporting part. The base is fixed on an inner surface of a computer case. The pressing part is pivotally connected to the base. The pressing part has a pin located on a first surface of the pressing part to press an add-in card on a motherboard. The supporting part is connected to the base. The latch is located on one side of the supporting part and presses a second surface of the pressing part when the pressing part presses the add-in card. The second surface of the pressing part is opposite the first surface of the pressing part.

12 Claims, 5 Drawing Sheets

ADD-IN CARD FASTENER

BACKGROUND

1. Field of Invention

The present invention relates to a fastener. More particularly, the present invention relates to an add-in card fastener.

2. Description of Related Art

Personal computers have become very important in our daily lives. Various add-in cards, such as network cards or sound cards, are plugged in the personal computer to enable internet access and generate better sound effect.

The add-in card is conventionally fixed in the computer case with a screw. However, such method requires a tool, such as a screwdriver, to install or remove the add-in card. Besides, oxidization of the screw always makes it difficult to uninstall the add-in card from the computer.

SUMMARY

An add-in card fastener is provided. The fastener includes a base, a pressing part, a latch and a supporting part. The base is fixed on an inner surface of a computer case. The pressing part is pivotally connected to the base. The pressing part has a pin located on a first surface of the pressing part to press an add-in card on a motherboard. The supporting part is connected to the base. The latch is located on one side of the supporting part. The latch presses a second surface of the pressing part when the pressing part presses the add-in card. The second surface of the pressing part is opposite the first surface of the pressing part.

An add-in card fastener for is provided. The fastener includes a base, a pressing part, a supporting part and a latch. The base is fixed on an inner surface of a computer case. The pressing part is pivotally connected to the base and can be pivoted between a first position and a second position. The pressing part has a pin located on a first surface of the pressing part to engage with a fixed sheet of the add-in card to fix the add-in card on the motherboard. The supporting part is connected to the base. The latch is located on one side of the supporting part. The latch touches a second surface of the pressing part when the pressing part is in the second position. The second surface of the pressing part is opposite the first surface of the pressing part.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
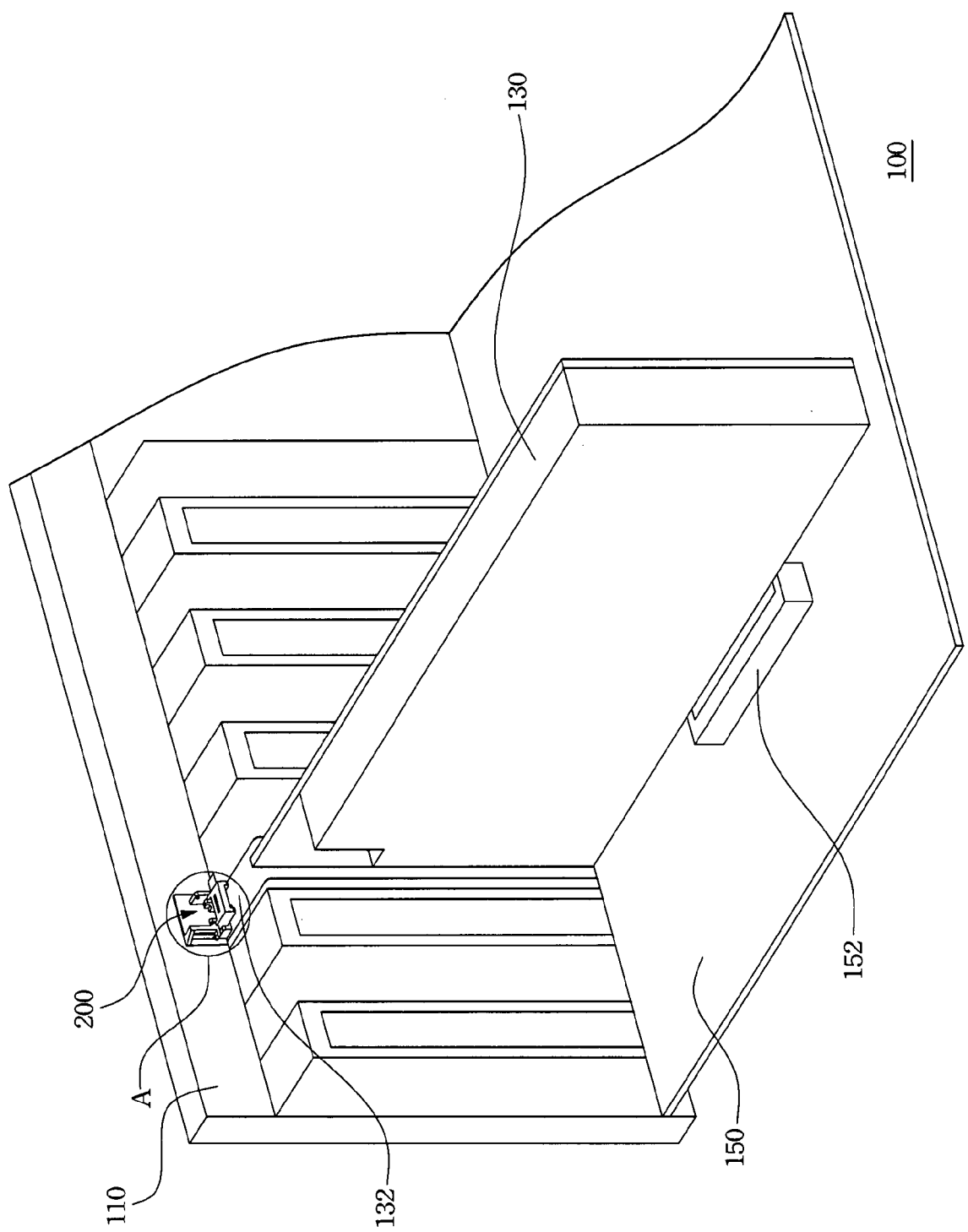
FIG. 1 shows an inside view of a computer according to one embodiment of the present invention.

FIG. 1 shows an inside view of a computer according to one embodiment of the present invention. Computer 100 includes a computer case 110, an add-in card 130, a motherboard 150 and an add-in card fastener 200. The add-in card 130 is plugged into an add-in card slot 152 on the motherboard 150. The add-in card 130 has a fixed sheet 132 adjacent to the computer case 110. The add-in card fastener 200 fastens the fixed sheet 132 to the computer case 110.

Figure 2A:
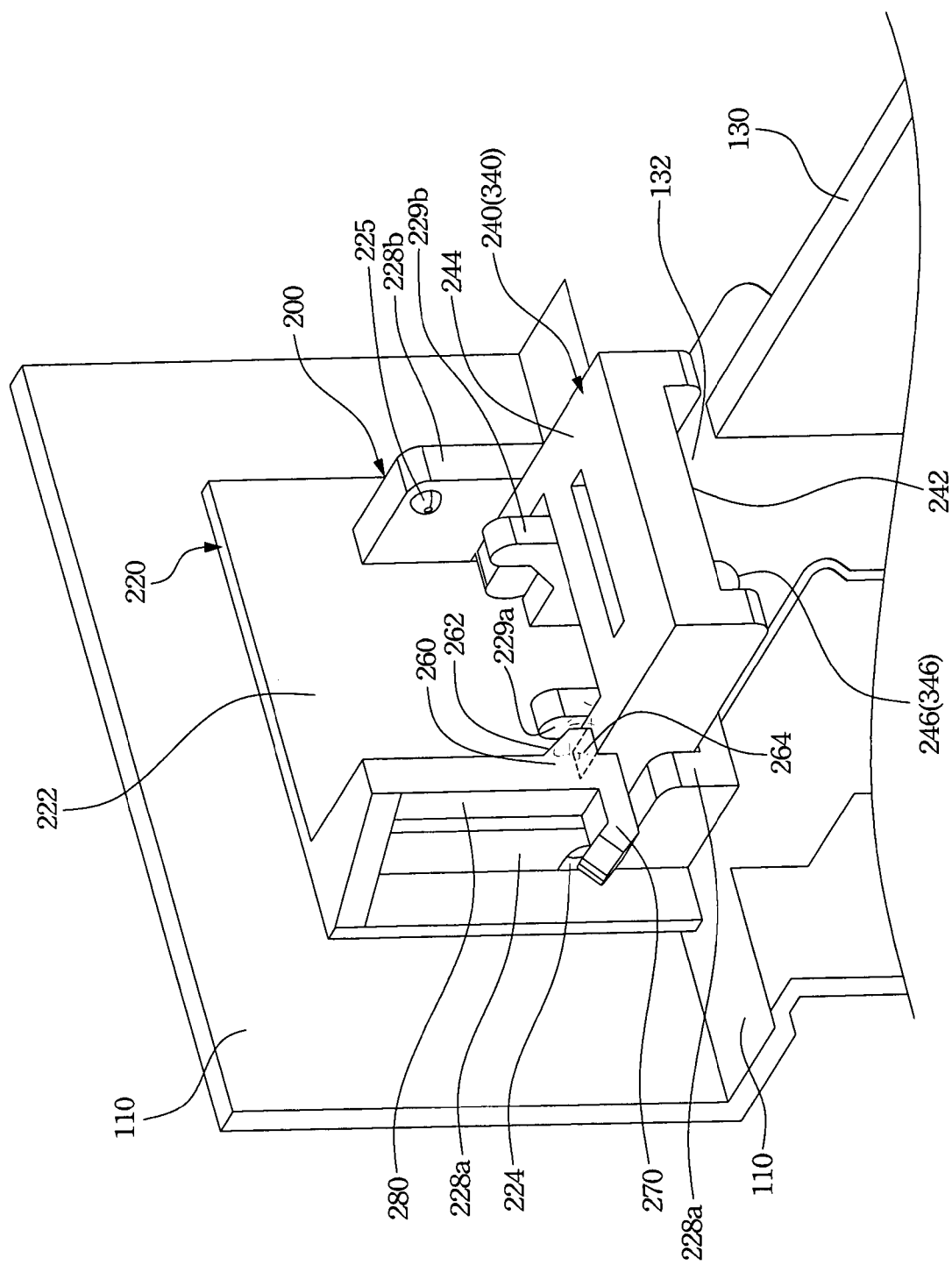
FIG. 2A shows a magnification view of part A shown in FIG. 1.
Figure 2B:
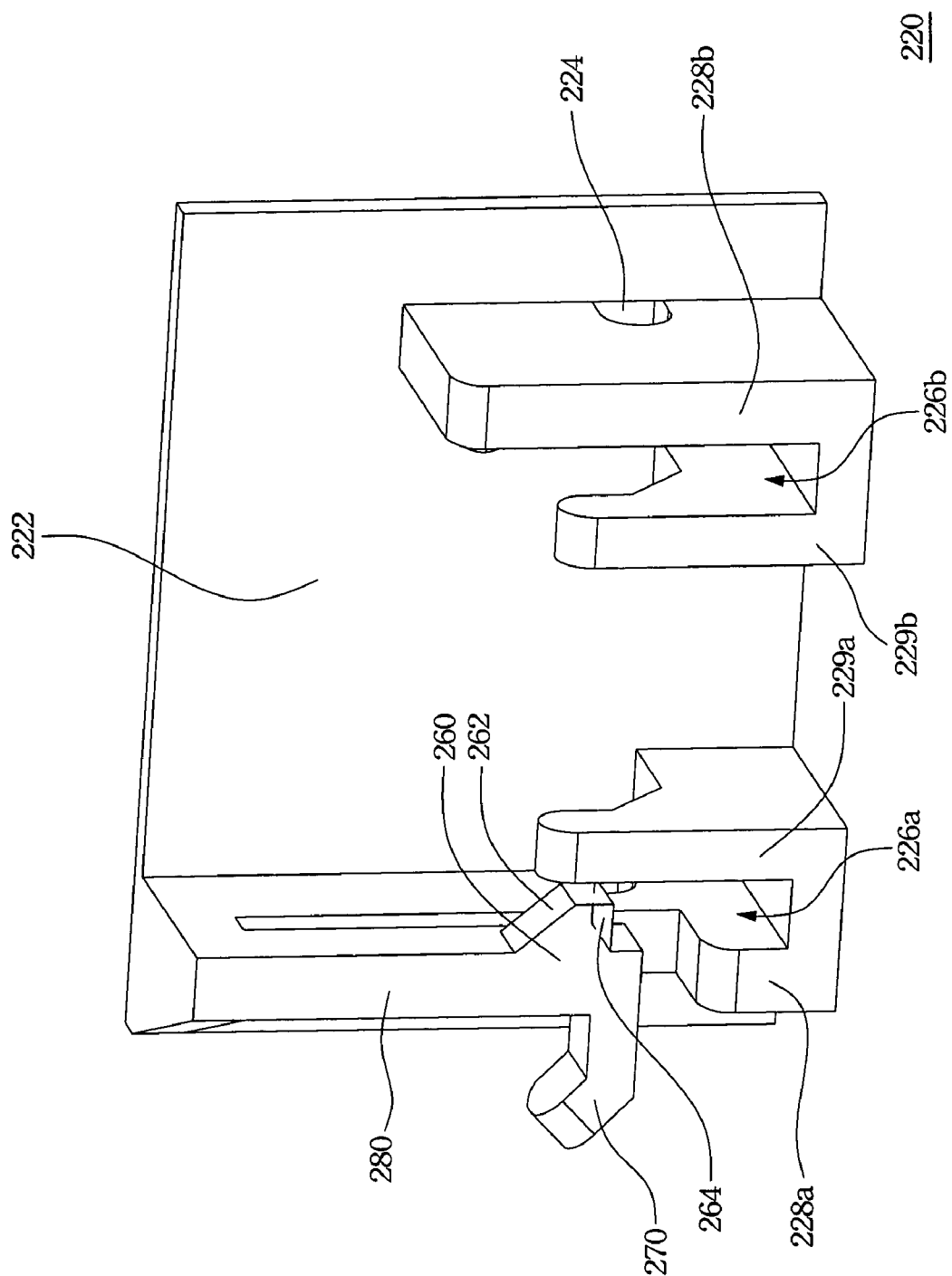
FIGS. 2B~2C show the base 220 and the pressing part 240 of FIG. 2A, respectively.
Figure 2C:
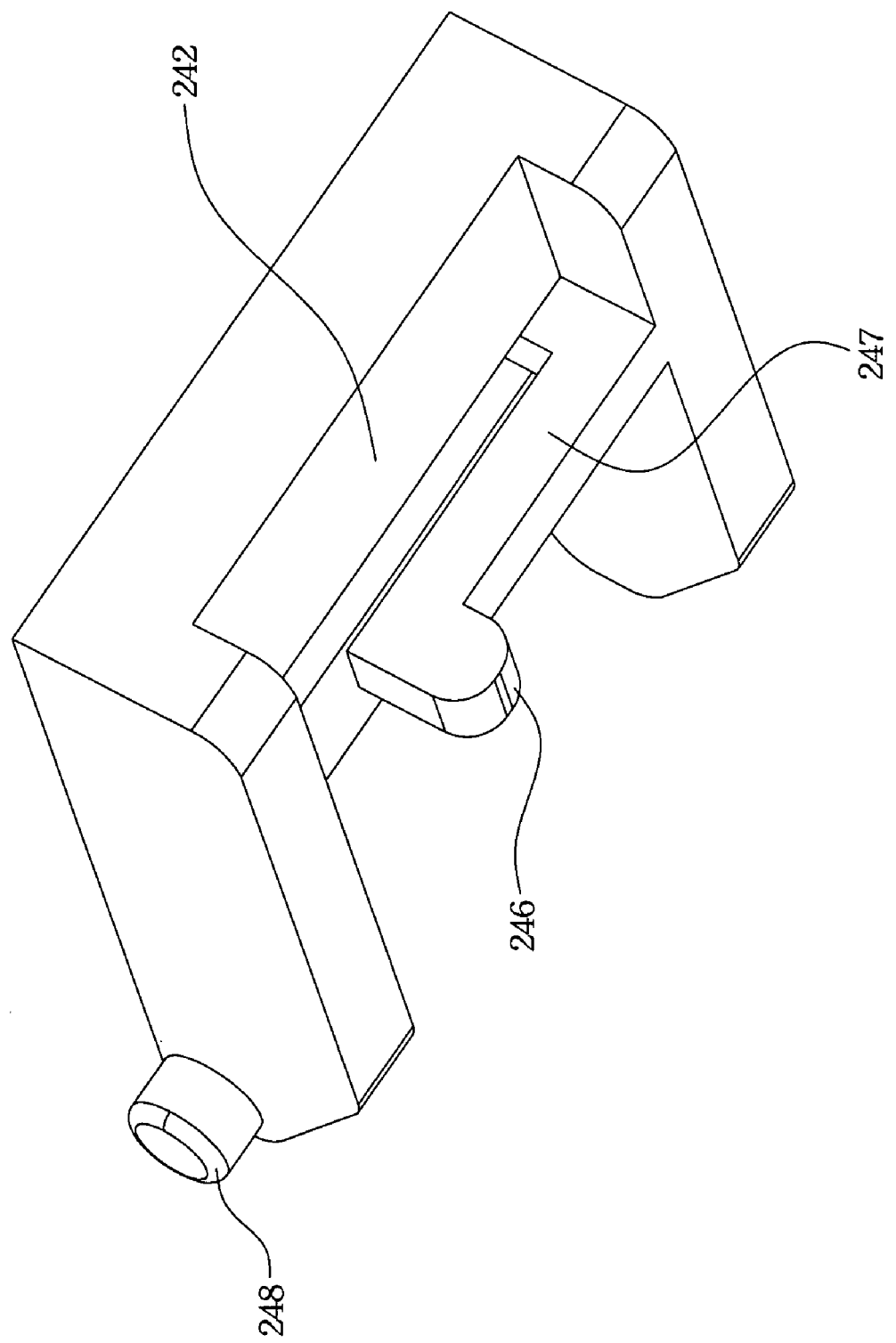

FIG. 2A is a magnification view of part A shown in FIG. 1. FIGS. 2B~2C show the base 220 and the pressing part 240 of FIG. 2A, respectively. The add-in card fastener 200 includes a base 220, a pressing part 240, a latch 260 and a supporting part 280. The base 220 is fixed on the inner surface of the computer case 110. The pressing part 240 is pivotally connected to the base 220. The pressing part 240 has a pin 246 located on a first surface 242 of the pressing part 240 to press the fixed sheet 132 of the add-in card 130. The supporting part 280 is connected to the base 220 and can be made of an elastic material. The latch 260 is located on one side of the supporting part 280. The latch 260 presses a second surface 244 of the pressing part 240 when the pressing part 240 presses the fixed sheet 132 of the add-in card 130. The second surface 244 of the pressing part 240 is opposite the first surface 242 of the pressing part 240.

Figure 3:
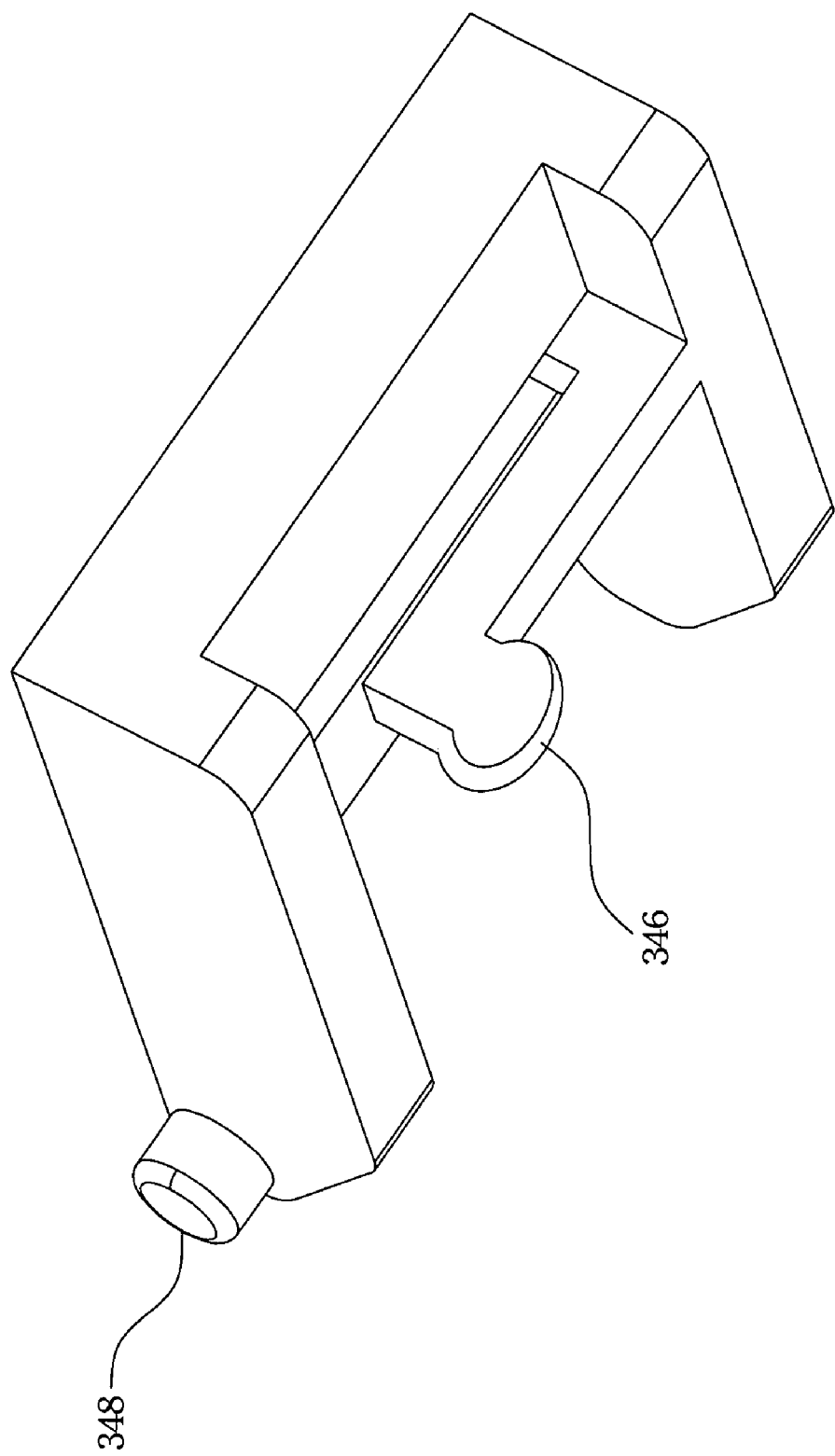
FIG. 3 shows a pressing part 340 of the add-in card fastener according to another embodiment of the present invention.

FIG. 3 shows a pressing part 340 of the add-in card fastener according to another embodiment of the present invention. Referring to FIG. 3 and FIGS. 2A~2B, the pressing part 340 is pivotally connected to the base and can be pivoted between a first position (for example, the position provides that the angle between the pressing part 340 and the base 220 is about 0°) and a second position (for example, the position provides that the angle between the pressing part 340 and the base 220 is about 90°). The pin 346 of the pressing part 340 can securely engage with the fixed sheet 132 of the add-in card 130, thereby, the add-in card 130 can be installed on the motherboard. More particularly, the latch 260 can touch the second surface 244 of the pressing part 340 to securely engage the pin 346 with the fixed sheet 132 of the add-in card 130 when the angle between the pressing part 340 and the base 220 is about 90°.

In the present invention, the word "about" is used to illustrate possible minor modification. Such modification does not change the spirit of the present invention. For example, the sentence "the latch 260 can touch the second surface 244 of the pressing part 340 to securely engage the pin 346 with the fixed sheet 132 of the add-in card 130 when the angle between the pressing part 340 and the base 220 is about 90°" described in the embodiment of this invention means that the angle between the pressing part and the base can be slightly larger than 90°, or slightly less than 90°, as long as the pin can be securely engaged with the fixed sheet 132 of the add-in card 130.

By using the add-in card fastener given above, users can install or uninstall the add-in card directly by their hands. Besides, the add-in card fastener given above can be used for installing the add-in card without using a screw, therefore, oxidization of the screw can be avoided.

Referring to FIGS. 2A~2B, the base 220 further includes two pivot holes 224 located on a first outer wall 228*a* and a second outer wall 228*b* of the base 220, respectively. Moreover, the pivot 248 of the pressing part 240 shown in FIG. 2C (or pivot 348 of the pressing part 340) can be pivotally connected in the pivot holes 224.

When the user wants to fasten the add-in card 130 on the motherboard by the add-in card fastener 200, the pressing part 240 is rotated to press the add-in card 130 (or about 90° from the base 220). The surface of the latch 260 pressing the pressing part 240 is a flat surface 264. Moreover, the normal direction of the flat surface 264 is approximately parallel with the extended direction of the supporting part 280.

Moreover, the latch 260 can further include a slope surface 262 opposite the flat surface 264. The slope surface 262 is inclined from the supporting part 280 to the flat surface 264. By using the slope surface 262 design given above, the pressing part 240 can pass through the latch 260 easily and reach the location for pressing the fixed sheet 132 of the add-in card 130 (or location for engaging the pin 346 with the fixed sheet 132 of the add-in card 130).

Referring to FIGS. 2A-2B, a first trench 226a is located between the first outer wall 228a and a first inner wall 229a of the base 220. A second trench 226b is located between the second outer wall 228b and a second inner wall 229b of the base 220. The pressing part 240 (or 340) is located in the first trench 226a and the second trench 226b when the pressing part 240 presses the fixed sheet 132 of the add-in card (or the pressing part 340 shown in FIG. 3 is securely engaged with the add-in card 130). Therefore, the shaking of the pressing part 240 (or 340) caused by external force impact can be avoided when the pressing part 240 (or 340) presses the add-in card or engaged with the add-in card.

Referring to FIGS. 2A & 2C, a connecting lever 247 connecting the pin 246 and the first surface 242 of the pressing part 240 is made of plastic material. One end of the connecting lever 247 is connected to the first surface 242 while the other end is hung in the air. Such structure further provides a downward pressing force when the pressing part 240 presses the fixed sheet 132 of the add-in card 130.

Referring to FIGS. 2A~2B, the add-in card fastener given above can further include a releasing lever 270. The releasing lever 270 is located on another side of the supporting part 280 opposite the latch 260 to control the deformation of the supporting part 280. When the user wants to uninstall the add-in card 130, the user can pull the releasing lever 270 and rotates the pressing part 240 (or 340) to take out the add-in card 130.

The base 220 given above can further include a collecting part 222. The second outer wall 228b can have a protrusion 225 located thereon. The collecting part 222 can accommodate the pressing part 240 when the pressing part 240 (or 340) releases the add-in card 130 (or the angle between the pressing part and the base is about 0°). The protrusion 225 can press against the first surface 242 of the pressing part 240 to fix the pressing part 240 in the collecting part 222.

Although the present invention has been described in considerable detail with reference to certain embodiments thereof, other embodiments are possible. Therefore, their spirit and scope of the appended claims should no be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An add-in card fastener, comprising:
 a base fixed on an inner surface of a computer case and comprising a first trench and a second trench;
 a pressing part pivotally connected to the base, wherein the pressing part has a pin located on a first surface of the pressing part to press an add-in card on a motherboard, the pressing part is located in the first trench and the second trench when the pressing cart presses the add-in card;
 a supporting part connected to the base; and
 a latch located on one side of the supporting part and pressing a second surface of the pressing part when the pressing part pressing the add-in card, the second surface of the pressing part being opposite the first surface of the pressing part.

2. The add-in card fastener of claim 1, wherein the latch comprises a flat surface pressing the pressing part.

3. The add-in card fastener of claim 2, wherein the latch has a slope surface opposite the flat surface.

4. The add-in card fastener of claim 1, further comprising a releasing lever located on another side of the supporting part opposite the latch.

5. The add-in card fastener of claim 1, wherein the base further comprises a collecting part accommodating the pressing part when the pressing part releases the add-in card.

6. The add-in card fastener of claim 5, wherein an outer wall of the base comprises a protrusion, and the protrusion presses against the first surface of the pressing part to fix the pressing part in the collecting part.

7. An add-in card fastener, comprising:
 a base fixed on an inner surface of a computer case and comprising a first trench and a second trench;
 a pressing part pivotally connected to the base and pivoted between a first position and a second position, wherein the pressing part has an pin located on a first surface of the pressing part to engage with a fixed sheet of an add-in card such that the add-in card is fixed on the motherboard, the pressing part is located in the first trench and the second trench when the Pressing part presses the add-in card;
 a supporting part connected to the base; and
 a latch located on one side of the supporting part and touching a second surface of the pressing part when the pressing part being in the second position, the second surface of the pressing part being opposite the first surface of the pressing part.

8. The add-in card fastener of claim 7, wherein the latch comprises a flat surface touching the pressing part.

9. The add-in card fastener of claim 8, wherein the latch has a slope surface opposite the flat surface.

10. The add-in card fastener of claim 7, further comprising a releasing lever located on another side of the supporting part opposite the latch.

11. The add-in card fastener of claim 7, further comprising a collecting part accommodating the pressing part when the pressing part in the first position.

12. The add-in card fastener of claim 11, wherein a first outer wall of the base comprises a protrusion, and the protrusion presses against the first surface of the pressing part to fix the pressing part in the collecting part.

* * * * *